United States Patent

[11] 3,554,556

| | | |
|---|---|---|
| [72] | Inventor | Ralph H. Stewart |
| | | Los Angeles, Calif. |
| [21] | Appl. No. | 804,490 |
| [22] | Filed | Mar. 5, 1969 |
| [45] | Patented | Jan. 12, 1971 |
| [73] | Assignee | Mattel Inc. |
| | | Hawthorne, Calif. |
| | | a corporation of Delaware |

[54] TALKING LEARNING PUZZLE
17 Claims, 8 Drawing Figs.

[52] U.S. Cl. .................................................. 274/1, 274/9
[51] Int. Cl. ........................................ G11b 25/04
[50] Field of Search ........................................ 274/1.0, 1.1, 9, 10, 11; 35/35.3

[56] References Cited
UNITED STATES PATENTS
3,383,114  5/1968  Ryan ........................... 274/1

Primary Examiner—Leonard Forman
Assistant Examiner—A. J. Mirabito
Attorney—Seymour A. Scholnick ABSTRACT: A teaching device having a phonograph record containing a plurality of sound tracks in interleaved grooves selectively playable in response to a rotatable and depressable dial, the dial coacting with locking means preventing depression of the dial, the housing having means for receiving a selected puzzle having an indexing portion for aligning the puzzle with respect to the housing and a detent for receiving a portion of the dial, the puzzle disengaging the locking means allowing the depression of the dial so that the portion thereof engages the detent whereby the sound track corresponding to the selected puzzle is reproduced.

PATENTED JAN 12 1971
3,554,556
SHEET 1 OF 2
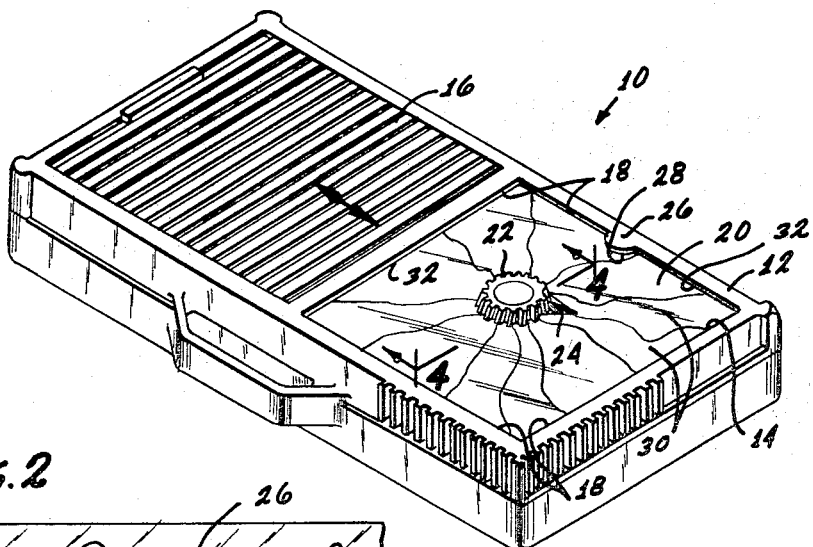
FIG. 1
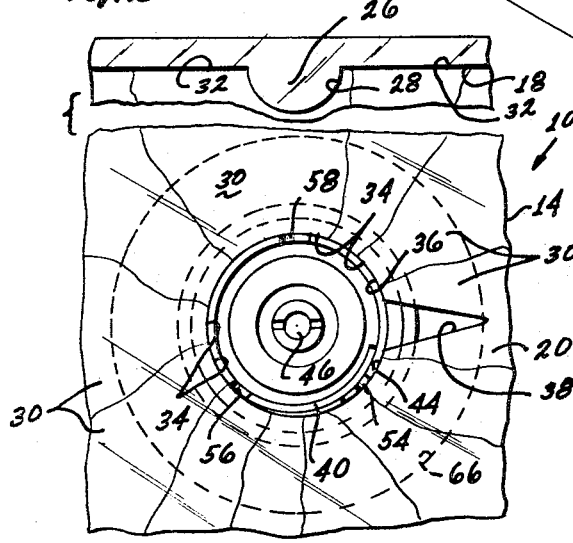
FIG. 2
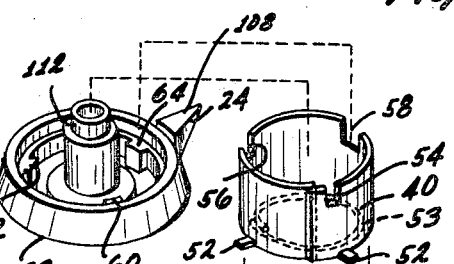
FIG. 3
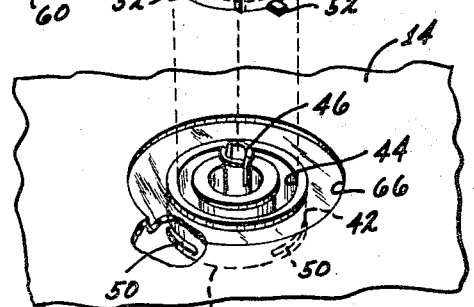
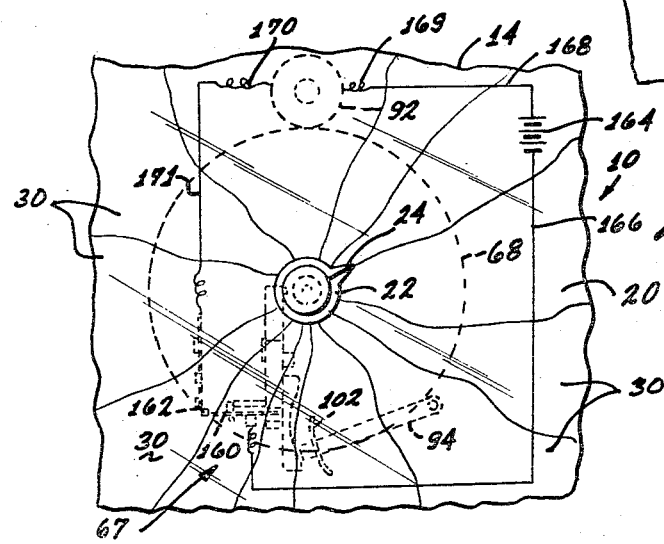
FIG. 8
INVENTOR
RALPH H. STEWART
BY Max E. Shirley
ATTORNEY

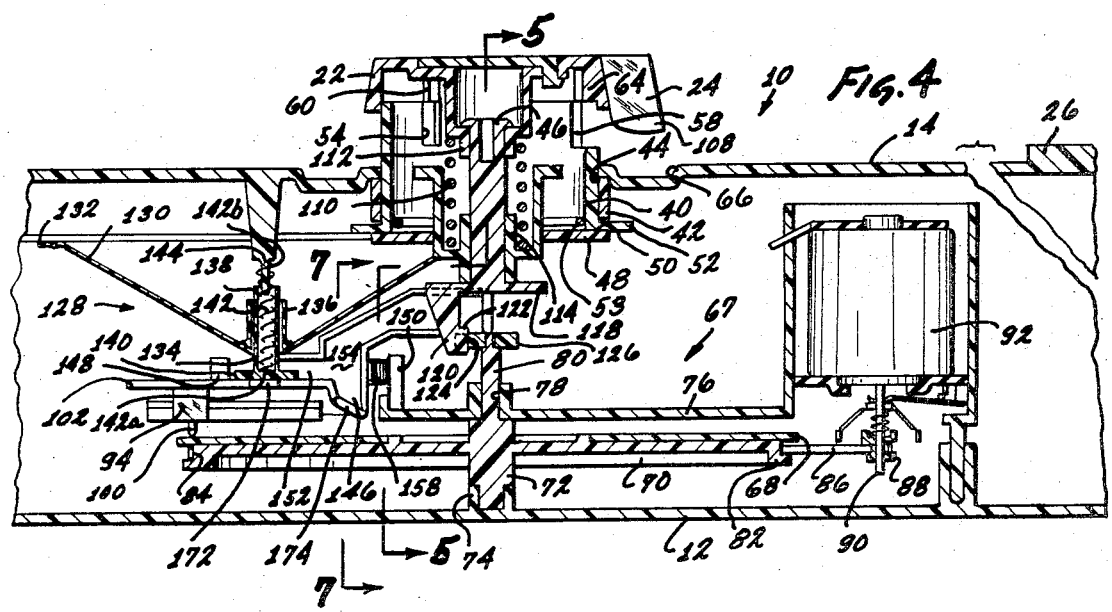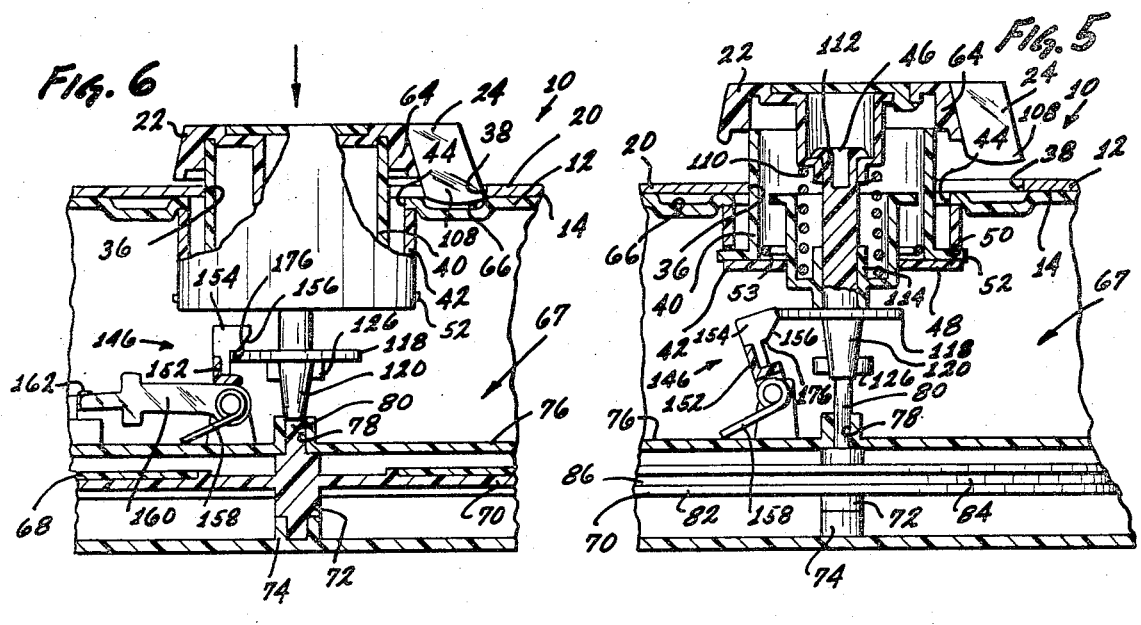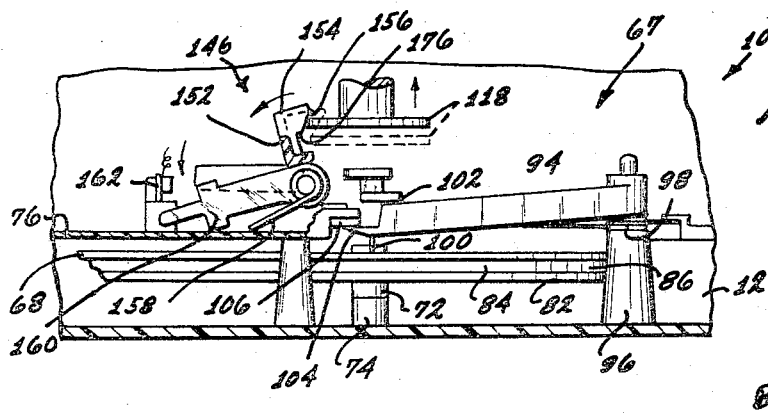

TALKING LEARNING PUZZLE

BACKGROUND OF THE INVENTION

The present invention relates to a new and useful, electrically-operated teaching device having sound-reproducing means which may be conditioned by a user of the device to reproduce predetermined segments of recorded information, related to a subject about which the user wishes to be informed. More particularly the conditioning means may comprise a removable display which coacts with a selecting mechanism to reproduce a segment of recorded information corresponding to the display. Prior art devices have included a phonograph record having successive or annular sound tracks with the tone arm being positioned by a removable display which indexes the tone arm along the radius of the record according to the length of a groove in the display. Other prior art devices with removable display means have taken the form of a book with a manually actuated lever mechanism for setting the tone arm position according to the page of the book.

A teaching machine is disclosed in U.S. Pat. No. 3,383,114, which utilizes a multiple track record with spiral interleaved grooves, each containing a different message or sound. Each groove commences adjacent the periphery of the record. The teaching machine contains a dial on the outside surface of the housing which has a circular segmented indicator means thereon. A dial is rotated to a particular segment bearing indicia representative of the sound on the particular groove correlated with the indicia. A drawstring connected to the sound reproducing means is then pulled to bias the record for rotation and position a needle to reproduce the sound on the groove.

It is accordingly an object of this invention to produce a new and improved teaching device utilizing a multiple-groove record.

It is another object of this invention to provide a new and improved teaching device having removable display means.

It is a further object of this invention to provide a new and improved teaching device which is electrically operated.

It is still another object of this invention to provide a new and improved electrically operated teaching device with a dial which is rotatable to select the predetermined sound sequence and depressable to actuate the mechanism to reproduce the sequence.

It is still a further object of this invention to provide a new and improved teaching device with a dial depressable in only one position in the absence of the display means which position reproduces the groove corresponding to instructions for the use of the machine.

It is yet another object of this invention to provide a new and improved teaching device with the dial selectively depressable in only one position according to the removable display means utilized, the one position corresponding to the sound sequence associated with the display means.

SUMMARY OF THE INVENTION

The foregoing and other objects of the invention are accomplished by providing a teaching device with removable display means, the device having a housing with a multiple-groove phonograph record rotatably mounted therein. The record has segments of recorded information with a separate lead-in groove adjacent the outer periphery of the record for each segment. A dial pointer is rotatable and is keyed to rotate the record and place the corresponding lead-in groove in position with respect to a tone arm which bears the phonograph needle and coacts with a sound-reproducing means including a speaker cone. The dial which is depressable to actuate the operating mechanism to reproduce the recorded segment is ordinarily depressable in only one position in the absence of the display means, this position corresponding to the groove containing instructions for use of the machine. The display means coact with the housing and locking means which engage the dial. The display means disengage the locking means to permit partial depression of the dial in any position. An indexing aperture on the selected display means receives a projection on the pointer of the dial to permit complete depression of the dial to actuate the operating mechanism. The removable display means may comprise, for example, a puzzle with scenes on both sides so that the indexing aperture can be utilized for two distinct sound sequences with the dial positions being 180° apart.

BRIEF DESCRIPTION OF THE DRAWINGS

Further objects, features and advantages of the invention will be pointed out with particularity in the following description when taken in conjunction with the drawings in which:

FIG. 1 is a perspective view of the teaching device according to the invention;

FIG. 2 is a plan view of a portion of the teaching device of FIG. 1 with the dial removed;

FIG. 3 is a partial isometric view of the teaching device of FIG. 1 with the display means removed, the dial removed and inverted, and the locking sleeve removed;

FIG. 4 is an enlarged sectional view taken along line 4—4 of FIG. 1 with the display means removed and the dial pointer rotated;

FIG. 5 is a sectional view taken along line 5—5 of FIG. 4 with the dial rotated and the display means in place;

FIG. 6 is a sectional view similar to FIG. 5 with the dial depressed;

FIG. 7 is a partial sectional view taken along line 7—7 of FIG. 4; and

FIG. 8 is a partially diagrammatic, partially schematic view showing the electrical circuitry of the teaching device.

DESCRIPTION OF THE PREFERRED EMBODIMENT

Referring now to the drawings and more particularly to FIG. 1, there is shown a teaching device generally designated 10 which includes a housing 12 having a display-means-receiving portion 14 and a compartment 16 for storing the puzzles or display means 20. The display-means-receiving portion 14 is recessed and generally rectangular having four walls 18 defining the opening for receiving a puzzle 20. A rotatable dial 22 having a pointer 24 is generally centrally located in the puzzle receiving portion 14.

The puzzle 20 is composed of a plurality of interlocking pieces which when assembled are configured for frictional engagement at its outer periphery with the walls 18. A positioning tab 26 is provided by a semicircular raised rib within the puzzle receiving portion 14. The tab 26 is generally centered along one wall 18 and the puzzle 20 is provided with a cutout portion 28 which mates with the tab 26. As shown in FIG. 2, the pieces of the puzzle 20 are so configured that each piece 30 has at least one straight edge 32 for engagement with a wall 18, and one arcuate edge 34. With the puzzle 20 assembled the arcuate edges 34 define a generally centrally-located circular aperture 36 which encompasses the pointer 24, for reasons which will hereinafter become obvious. One piece 30 is provided with a generally triangular aperture 38 which is utilized for indexing the dial pointer 24 with the selected puzzle 20.

FIG. 3 shows a view of the disassembled selecting mechanism including the dial 22 in an inverted position, and a flexible sleeve 40. The puzzle-receiving portion 14 has a centrally-located recessed cup 42 portion having a central aperture 44 through which protrudes a control shaft 46. The base 48 of the cup portion 42 is provided with three elongate slots, like the one shown at 50, circumferentially displaced about the periphery of the base 48. The sleeve 40 is formed from a band of flexible material with an overlapping of the ends to form a cylindrical configuration. Three outwardly extending tabs 52 are formed integral with the lower edge of the band and are displaced for engagement with slots 50 as the sleeve 40 is compressed and inserted into cup portion 42. Two of the slots 50 may be slightly wider than the width of their engaged tab 50 to provide for lateral movement as the sleeve 40 is compressed during operation of the selection mechanism. Sleeve 40 is maintained in an expanded condition by a spring 53.

The sleeve 40 is slotted along its upper edge at three locations to provide two slots 54 and 56 of approximately the same configuration and a third slot 58 having the same depth but of greater width. The undersurface of dial 22 is provided with three integral generally rectangular bosses, two of which numbered 60 and 62 are configured for slidable engagement within slots 54 and 56, while the third oversized boss 64 is configured for slidable engagement within slot 58 of sleeve 40. Concentric with shaft 46 is a circular indentation 66 for reasons which will hereinafter become apparent.

Referring now to FIGS. 5—7, the teaching device 10 includes a sound reproducing mechanism 67 having a multigrooved phonograph record 68 of the type shown and described in U.S. Pat. no. 3,017,187, the record being rotatably mounted on turntable 70 within housing 12. The turntable 70 has a central hub portion 72 positioned in a bearing 74 formed in the lower portion of housing 12. A main support frame 76 has an aperture 78 therein for receiving axle 80 of hub portion 72 to permit rotation of turntable 70 with respect to the housing 12 and support frame 76 which is suitably secured thereto.

The turntable 70 has a lip 82 formed about the periphery thereof and the record 68 overlaps the turntable 70 thereby resulting in a groove 84 which engages an endless belt 86. The belt 86 also engages a drive pulley 88 secured to shaft 90 of motor 92 affixed to support frame 76.

Sound-reproducing mechanism 67 includes a tone arm 94 pivotally secured to a boss 96 (FIG. 7) on the lower part of housing 12 to permit tone arm 94 to swing radially over record 68. The tone arm 94 is normally biased to the periphery of record 68 by a hinge spring 98. Spring 98 also exerts an upward force for reasons which will hereinafter become obvious. The free end of the tone arm 94 has a phonograph needle 100 affixed thereto for engaging the grooves of the record 68. Disposed opposite the needle 100 is a transversely-extending, arcuate rib 102 secured to the tone arm 94 (see FIG. 8). A transversely extending guide member 104 extends out from the free end of tone arm 94 adjacent needle 100. The guide member 104 abuts in slideable relation with a projection 106 formed in support frame 76 to guide needle 100 during its traversal of record 68.

As seen in FIG. 4, the upper part of housing 12 has cup 42 centrally located therein with the shaft 46 being rotatable and axially movable in the aperture 44. The dial 22 is secured to one end of shaft 46 extending out from housing 12. The pointer 24 of dial 22 is provided with a downwardly extending protuberance 108. The upper edge of sleeve 40 normally engages the bosses 60, 62, and 64 on the underside of the dial 22 in the absence of puzzle 20. Additionally, dial 22 is normally biased upwardly by a coil spring 110 encircling shaft 46 between a hub 112 on the undersurface of dial pointer 22 and a hub 114 formed about an aperture opposite cup portion 42.

The other end of shaft 46 is provided with a disc 118 formed integral therewith and having a downwardly-depending, generally L-shaped blade member 120 with the short leg 122 thereof being keyed in a slot 124 in a second axially aligned disc 126 secured to the upper end of axle 80 of turntable 70. The short leg 122 is so configured to engage slot 124 only when the dial 22 is in its normal upwardly biased position, thus permitting the turntable 70 to be keyed for rotation with the dial 22 during operation of the device.

On the underside of the upper part of housing 12 is a speaker assembly 128 which includes a speaker cone 130 secured, as by adhesive, to a skirt 132. At the apex 134 of speaker cone 130 is an aperture through which is secured a cylinder 136 having a piston 138 slideably positioned therein. The piston 138 is provided with an enlarged disc portion 140 which slidingly abuts arcuate, transversely-extending member 102 of tone arm 94. The piston 138 is biased downwardly by means of coil spring 142 having an end 142a positioned therein. The other end 142b of spring 142 engages a downwardly extending pin 144 axially aligned with piston 138.

An operating arm 146 is secured to support frame 76 for limited pivotal movement about an axis transverse to and offset from the axis of rotation of record 68 in proximity to the path of movement of needle 100 on tone arm 94. Spaced, upwardly-extending projections 148 and 150 on support frame 76 have pivot beam 152 of operating arm 146 interposed therebetween and secured thereto by suitable hinge pins (not shown). Extending upwardly and inwardly from pivot beam 152 is a latching arm 154 having a radially extending cam surface 156 (FIGS. 5, 6 and 7) engaging the circumference of disc 118 on shaft 46. Cam surface 156 is positioned on a radius of shaft 46. Operating arm 146 is biased by a hinge spring 158 to urge cam surface 156 into engagement with disc 118.

Secured to the other end of pivot beam 152 is a movable electrical contact member 160 which is disposed generally transversely to the axis of pivot beam 152. In proximity to movable contact member 160 a fixed contact member 162 is secured to support frame 76.

As shown in FIG. 8, a normally open electrical circuit is provided from one end of a battery 164 through conductor 166 to movable contact member 160 and from the other end of battery 164 through a conductor 168 to one terminal 169 of motor 92 and through the other terminal 170 of motor 92 and a conductor 171 to fixed contact member 162.

One end of the pivot beam 152 is provided with a toe 172 (FIG. 4) extending generally parallel to and in proximity with the underside of enlarged disc portion 140 of piston 138. Adjacent projection 150 the pivot beam 152 is provided with a release cam 174 having the cam surface thereof disposed to coact with transversely extending guide member 102 of tone arm 94 at the end of one operational cycle.

OPERATION OF THE TEACHING DEVICE

Initially, in the absence of a puzzle 20, the dial 22 is biased upwardly and generally locked in position by sleeve 40 being expanded to the outer limits of cup portion 42. The upper edge of sleeve 40 engages the bosses 60, 62 and 64 on the undersurface of dial 22.

However, because of the bosses 60, 62 and 64 are capable of engaging slots 54, 56 and 58 the dial 20 is capable of being rotated and depressed in one initial position corresponding to the pointer 24 being aimed toward positioning tab 26. With boss 64 aligned with slot 58 of sleeve 40, a first operational cycle can be commenced for reproducing a predetermined segment of recorded information corresponding to instructions to the user as to the method of using the device. Initially the disc 118 at the lower end of shaft 46 is urging against cam surface 156 to engage operating arm 146 against cam surface 156 to urge operating arm 146 against the biasing force of its hinge spring 158 (see FIG. 5). Movable electrical contact 160 is urged counterclockwise (as viewed in FIG. 7) out of engagement with fixed contact 162. Tone arm 94 is biased to the outer periphery of record 68 by hinge spring 98. The downwardly-depending blade member 120 of disc 118 has the short leg 122 keyed to slot 124 of disc 126 secured to axle 80 of turntable 70.

As the dial 22 is rotated until pointer 24 is aligned with positioning tab 26, the turntable 70 is rotated by short leg 122 coacting with slot 124 of disc 126 to position the groove bearing sound recordings corresponding to the instructional sequence with respect to needle 100 of tone arm 94.

Dial 22 is then depressed with bosses 60, 62 and 64 slidably engaging slots 54, 56 and 58 of sleeve 40. Short leg 122 is then out of engagement with slot 124 of disc 126. Toe 172 then permits piston 138 to lower to allow the enlarged disc portion 140 to urge against transversely extending member 102 of tone arm 94. Needle 100 is then in contact with the groove. Movable contact 160 is provided with a certain amount of lost motion to permit the foregoing to occur prior to electrical contact with fixed contact 162 to energize motor 92. The operating arm 146 is locked in position by a detent 176 at the bottom of cam surface 156 (see FIG. 6) which maintains shaft 46 in its depressed condition during the cycle. Sonic vibrations from the groove are transmitted through needle 100, through transversely extending member 102 and through the enlarged disc portion 140 of piston 138 to thereby drive piston 138 and reproduce sound from speaker cone 130. As the tone arm 94 traverses its path, arcuate member 102 is in abutting sliding relationship with enlarged disc portion 140 of piston 138.

When tone arm 94 traverses the groove, guide member 104 integral with the free end thereof engages release cam 174 thereby urging operating arm 146 counterclockwise (as viewed in FIG. 7). Detent 176 is disengaged from disc 118 of shaft 46. The turntable 70 continues to rotate until slot 124 of disc 126 engages short leg 122 of blade member 120. Operating arm 146 continues its counterclockwise movement with toe 172 of pivot beam 152 urging enlarged disc portion 140 of piston 138 upwardly. Tone arm 94 raises slightly by virtue of the upward bias of hinge spring 98 until needle 100 clears the groove. Guide member 104 engages projection 106 in sliding relationship as the tone arm 94 returns to its original position at the periphery of record 68. Lastly, due to the lost motion switch, movable contact 160 is rotated out of engagement with fixed contact 162 to thereby deenergize motor 92.

The instructional sequence informs the user to place the puzzle 20 on the display receiving means 14 with respect to the positioning tab 26; to rotate the dial 22 until pointer 24 is aligned with the cutout 38; and depress the dial 22. As can be seen in FIG. 4, the protuberance 108 on pointer 24 is directly above the circular indentation 66. Originally, in the absence of puzzle 20, sleeve 40 is locked against bosses 60, 62 and 64 of dial 22 to prevent depression thereof in any but the one position. As the puzzle 20 is placed in position, the arcuate edges 34 of each piece 30 define a circle of smaller diameter than the original uncompressed diameter of sleeve 40. As each piece 30 is positioned, the sleeve 40 is compressed adjacent the piece until finally, with all pieces 30 in place, the compressed diameter of sleeve 40 is smaller than the circle formed by the inner surfaces of bosses 60, 62 and 64 on the underside of dial 22 (see FIGS. 5 and 6). The dial 22 can then be partially depressed in any radial position until the protuberance 108 abuts the surface of puzzle 20. This distance is insufficient to commence operation of the device. The dial 22 must be rotated until the protuberance 108 engages cutout 38 of puzzle 20. As the dial 22 is rotated to this position, the record 68 is rotated as previously described until the groove bearing the sound sequence corresponding to the selected puzzle is positioned with respect to the needle 100 of tone arm 94. The dial 22 is then depressed until protuberance 108 engages cutout 38 of puzzle 20 and rests at least partially in circular indentation 66. The thickness of puzzle 20, the depth of indentation 66 and the length of protuberance 108 are so chosen to prevent unintentional operation of the device in anything but the correct position corresponding to the selected puzzle 20. Once the dial 22 is depressed the operational cycle previously described repeats itself with the reproduction of the sound sequence corresponding to the selected puzzle.

Referring to FIG. 2, the positioning tab 26 is centrally located so that a given puzzle 20 can have a different picture on the reverse side thereof. By reversing the puzzle 20 it can be seen that cutout 38 for the reverse side would be displaced 180° from the original side with the pointer 24 of dial 22 in that position selecting the sequence of prerecorded information corresponding to that side of the puzzle 20.

While there has been shown and described a preferred embodiment of the invention it is to be understood that various adaptions and modifications may be made without departing from the spirit and scope of the invention and no limitations are intended by the details of construction and design herein shown and described other than as defined in the appended claims.

I claim:

1. In a teaching device, the combination comprising:
   housing means;
   means within said housing means containing a plurality of segments of recorded information to be taught to a user of said device;
   drive means coupled to said recorded information means;
   sound reproducing means engageable with said recorded information means for reproducing said segments of recorded information;
   manually controlled means movable in one direction between a first and a second position, said manually controlled means being movable in another direction for selecting a predetermined segment of recorded information;
   locking means engaging said manually controlled means for locking said manually controlled means in said first position; and
   a plurality of display means removably attachable to said housing and adapted for coacting with said housing means and said locking means to release said manually controlled means for movement to said second position when said manually controlled means is moved in said other direction to a setting for a predetermined segment of recorded information corresponding to said particular display means, said manually controlled means in said second position actuating said drive means to reproduce said predetermined segment of recorded information.

2. The combination according to claim 1 wherein said locking means includes means releasing said manually controlled means to move to said second position in the absence of said display means when said manually controlled means is moved in said other direction to one setting corresponding to a predetermined segment of recorded information having an instructional sound sequence.

3. The combination according to claim 1 wherein said removable display means is a puzzle having a plurality of interlocking segments.

4. The combination according to claim 3 wherein said housing means has a puzzle-receiving portion and a positioning tab within said puzzle-receiving portion, and said puzzle having a cutaway portion engaging said positioning tab for orienting said puzzle within said puzzle-receiving portion.

5. The combination according to claim 1 wherein said manually controlled means is a dial and said locking means includes a flexible sleeve formed into a cylindrical configuration with the ends thereof overlapping, said sleeve being interposed between the undersurface of said dial and a cup-shaped recess in said housing.

6. The combination according to claim 5 wherein said display means is a puzzle formed of a plurality of interlocking pieces, said pieces being so configured to define a circular aperture in said puzzle when assembled, said circular aperture being of a smaller diameter than said sleeve, said puzzle compressing said sleeve, the undersurface of said dial being configured for permitting depression of said dial when said sleeve is compressed.

7. The combination according to claim 5 wherein said sleeve has a plurality of slots in the upper edge thereof and said dial has a plurality of bosses in the undersurface thereof, said slots and said bosses being so dimensioned and so configured to permit slidable engagement of said bosses with said slots to operate said dial to said second position when said dial is rotated to said setting for predetermined segment of recorded information.

8. The combination according to claim 1 wherein said recorded information means is a phonograph disc record having recorded thereon a plurality of sound sequences, each of said sound sequences being recorded in a separate spiral groove, said spiral grooves being interleaved on said record with the beginning of each sound sequence being adjacent to the outer periphery of said record.

9. The combination according to claim 8 wherein said sound-reproducing means includes a tone arm pivotally secured to said housing means, said tone arm having a needle at the free end thereof for traversing said grooves.

10. The combination according to claim 5 wherein said sleeve includes a plurality of tabs on one edge thereof and said cup-shaped recess in said housing has a plurality of slots adapted for slidable engagement with said tabs.

11. The combination according to claim 6 wherein each of a plurality of said puzzles has a cutout at one preselected location and said dial has a protuberance for engaging said cutout to permit said dial to be operated to said second position.

12. The combination according to claim 11 wherein said housing means is provided with a circular indentation, said indentation being positioned for at least partially accepting said protuberance of said dial in said second position when said dial is rotated to any one of said settings.

13. The combination according to claim 1 including means for returning said manually operable means to said first position after reproducing said predetermined segment of recorded information.

14. In a teaching device, the combination comprising:
 means containing a plurality of segments of recorded information to be taught to a user of said device and means for reproducing the same;
 selectively settable means for selecting a segment of recorded information to be reproduced and also for initiating reproduction thereof; and
 plural display means, each corresponding to one of said segments of recorded information and being selectively positionable for controlling operation of said selecting means, said display means including means coacting with said selecting means preventing reproduction of said recorded information except when said selecting means is set for a predetermined segment of recorded information corresponding to said display means.

15. A teaching device as defined in claim 14 wherein said selectively settable means is movable in a first direction to initiate reproduction and movable in a second direction for selecting said predetermined segment of recorded information, said display means physically obstructing movement of said settable means in said first direction except when said settable means is set for said predetermined segment.

16. A teaching device as defined in claim 15 wherein said settable means is a member rotatable about an axis and slidable along said axis, said first direction being along said axis and said second direction being about said axis.

17. A teaching device as defined in claim 14 including means for positioning and holding said display means in predetermined position and orientation relative to said settable means.